E. T. SILVIUS.
FILING APPLIANCE.
APPLICATION FILED DEC. 23, 1910. RENEWED DEC. 28, 1915.
1,218,484.
Patented Mar. 6, 1917.
4 SHEETS—SHEET 1.
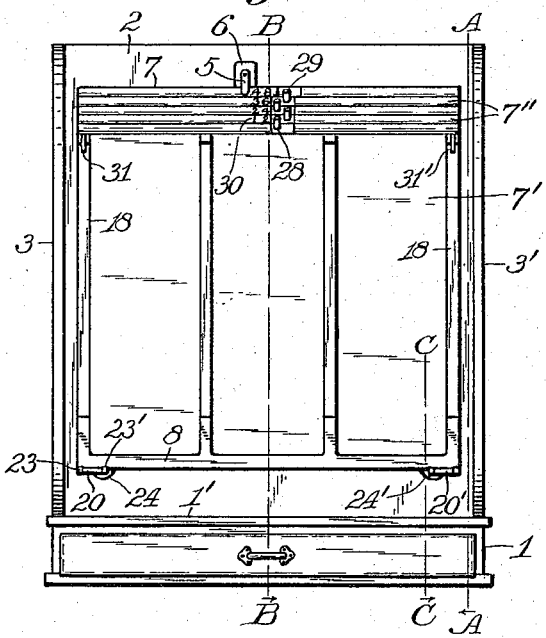
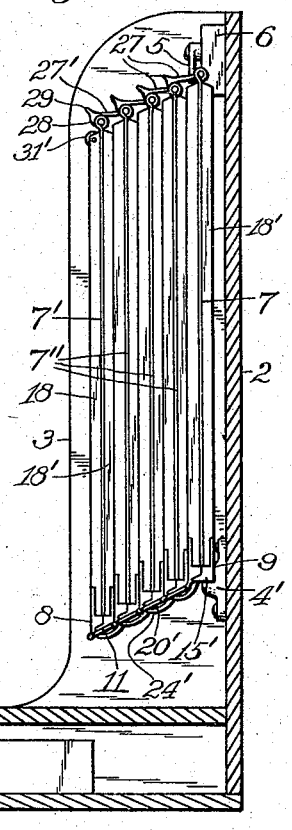
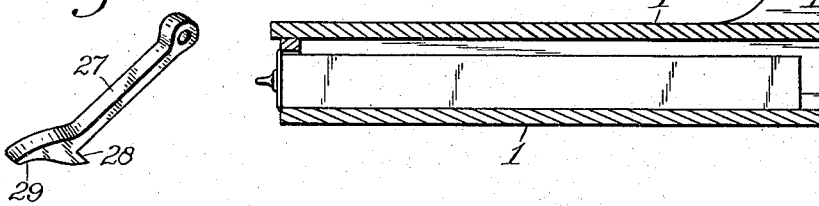
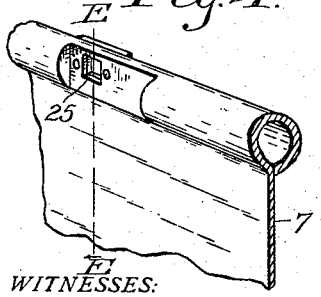
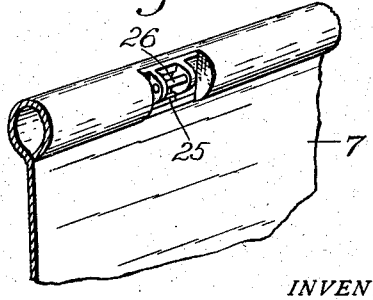
WITNESSES:
J. H. Gardner
K. R. Woddell
INVENTOR:
Ellis T. Silvius E. T. SILVIUS.
FILING APPLIANCE.
APPLICATION FILED DEC. 23, 1910. RENEWED DEC. 28, 1915.
1,218,484.
Patented Mar. 6, 1917.
4 SHEETS—SHEET 2.
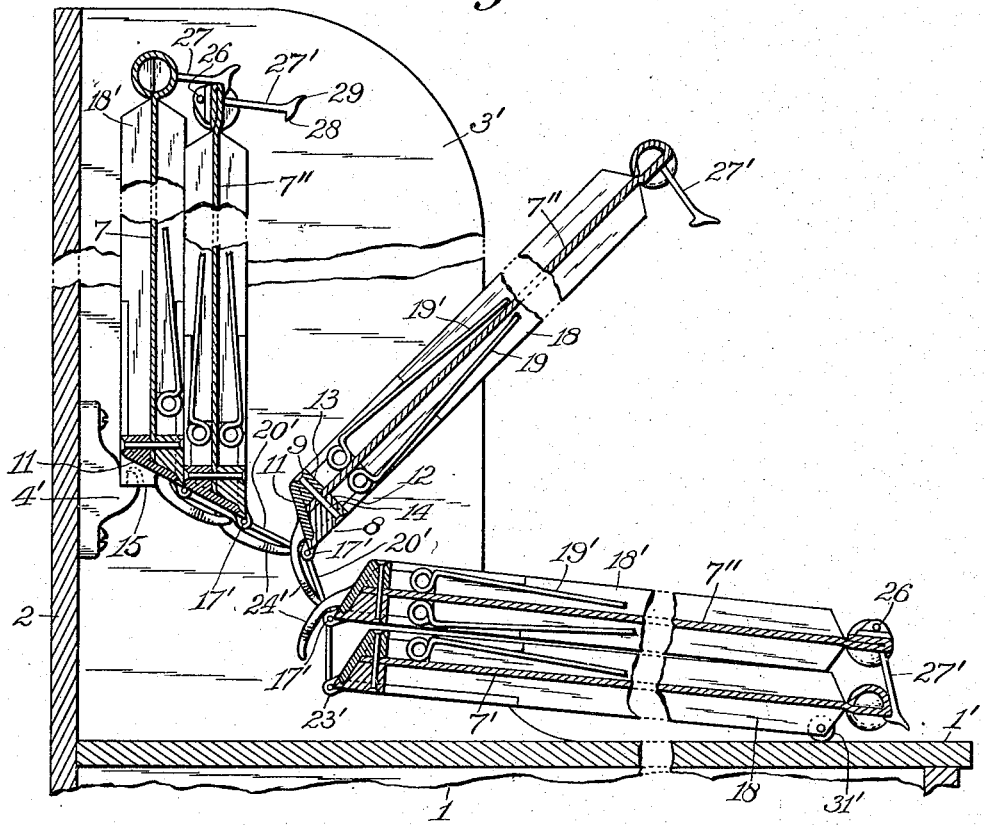
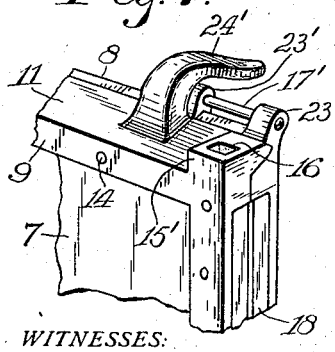
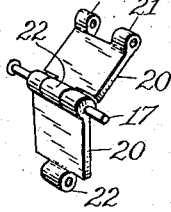
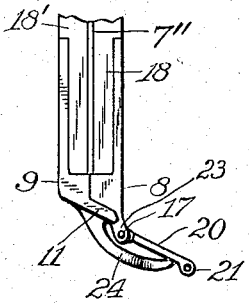
WITNESSES:
J. H. Gardner.
K. R. Woddell.
INVENTOR:
Ellis T. Silvius.

E. T. SILVIUS.
FILING APPLIANCE.
APPLICATION FILED DEC. 23, 1910. RENEWED DEC. 28, 1915.
1,218,484.
Patented Mar. 6, 1917.
4 SHEETS—SHEET 3.
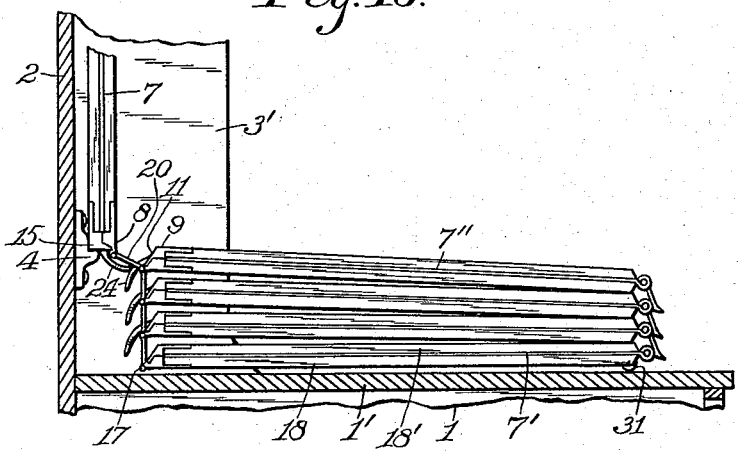
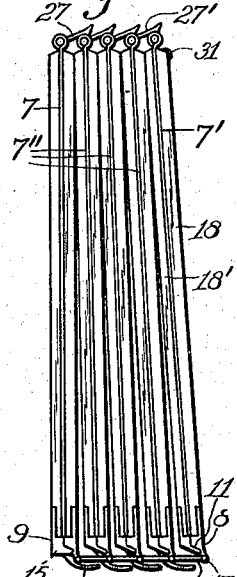
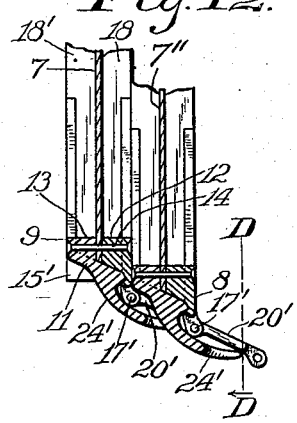
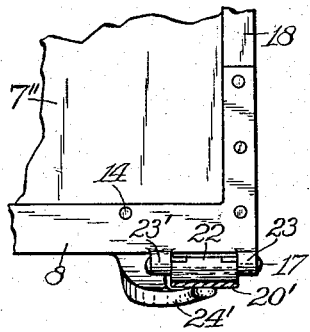
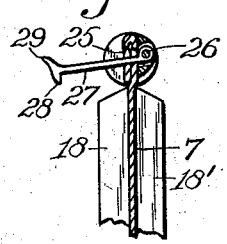
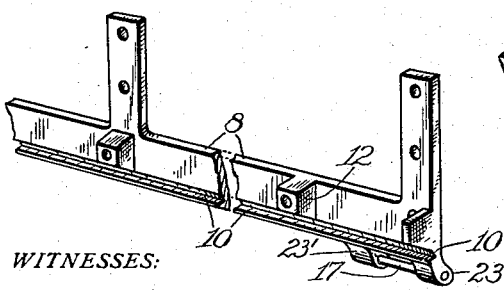
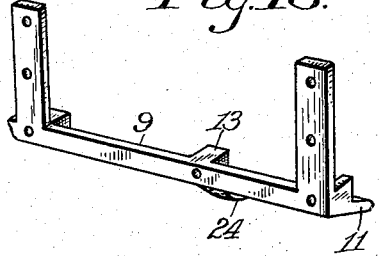
WITNESSES:
J. H. Gardner.
K. R. Woddell.
INVENTOR:
Ellis T. Silvius.

E. T. SILVIUS.
FILING APPLIANCE.
APPLICATION FILED DEC. 23, 1910. RENEWED DEC. 28, 1915.
1,218,484.
Patented Mar. 6, 1917.
4 SHEETS—SHEET 4.
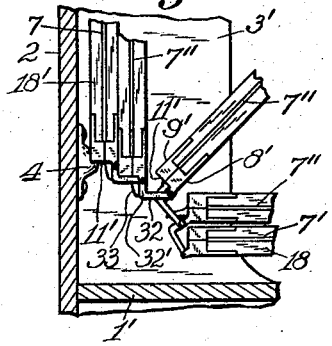
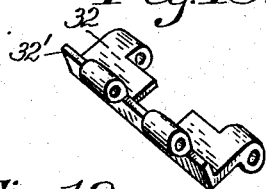
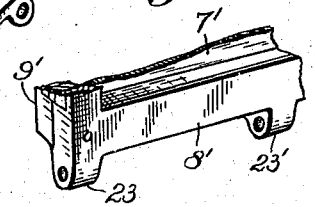
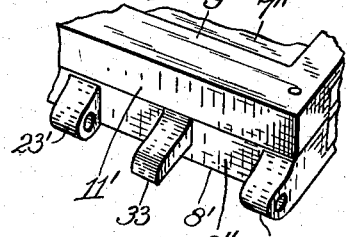
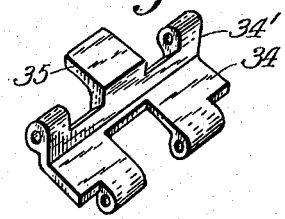
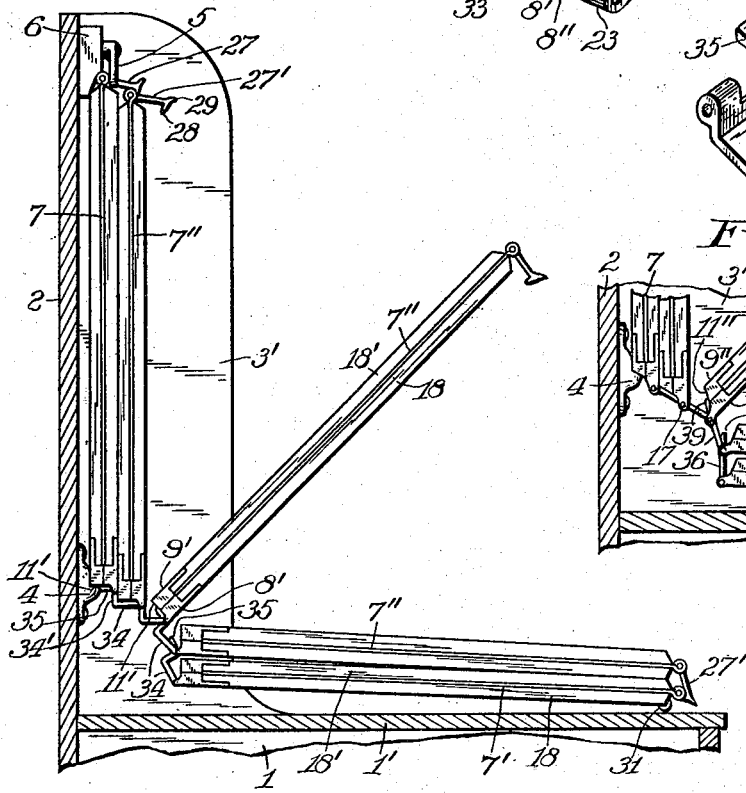
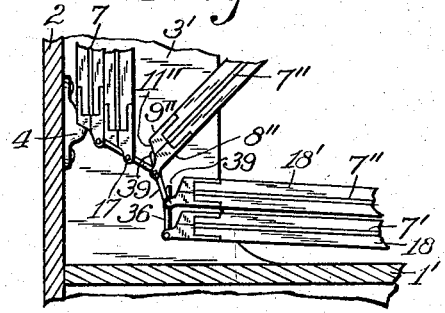
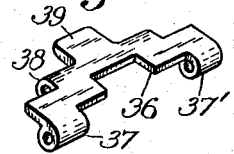
WITNESSES:
J. H. Gardner.
K. R. Woddell.
INVENTOR:
Ellis T. Silvius.

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,218,484.  Specification of Letters Patent.  Patented Mar. 6, 1917.

Application filed December 23, 1910, Serial No. 598,991. Renewed December 28, 1915. Serial No. 69,117.

*To all whom it may concern:*

Be it known that I, ELLIS T. SILVIUS, a citizen of the United States, residing at Indianapolis, in the county of Marion and State of Indiana, have invented a new and useful Improvement in Filing Appliances, of which the following is a specification, reference being had to the accompanying drawings and to the letters and figures of reference marked thereon.

This invention relates to the systematic filing of commercial papers, including bill-slips commonly used in credit account systems, the invention having reference particularly to file cabinets having movable bill holding leaves, means for connecting the leaves together, and means for supporting the leaves normally in upright position and permitting the leaves to be moved forward pivotally to prone position.

An object of the invention is to provide filing appliances of the above-mentioned character that will be adapted to be constructed simply and cheaply without the use of springs for assisting to hold the leaves in upright position; a further object being to provide a filing cabinet or register, including the bill holding leaves, of such construction that the leaves may be hung up in normal position, preferably in echelon arrangement, without requiring pivotal support in the case for the foremost leaf, and obviate the necessity of providing movable apparatus behind the rearmost leaf. A still further object is to provide means for connecting bill holding leaves together that will enable the leaves to be operated with ease and act to draw them rearward when moved to prone position, and which will not be liable to derangement in use.

With the above-mentioned and other objects in view, the invention consists in a plurality of bill holding leaves, links or hinge-plates connected to the normally lower forward portions of the leaves, and means for preventing pivotal movement of the links when the leaves are in normal upright position in face to face arrangement; and the invention consists further in the novel parts, and combinations and arrangements of parts, as hereinafter particularly described and claimed.

Referring to the drawings, Figure 1 is a front elevation of a filing cabinet including the improvements; Fig. 2, a vertical section approximately on the line A A in Fig. 1; Fig. 3, a perspective view of one of the preferred form of the leaf latches; Fig. 4, a fragmentary perspective view of one of the leaves showing the forward upper portion thereof; Fig. 5, a fragmentary perspective view showing the upper rear portion of the improved leaf as preferably constructed; Fig. 6, a vertical section on the plane of the line B B in Fig. 1 partially broken away with the filing leaves in various positions; Fig. 7, a fragmentary perspective view of the rearmost leaf inverted; Fig. 8, a perspective view of two of the preferred form of links for connecting the leaves together; Fig. 9, a fragmentary side elevation of one of the leaves and its hinging connection; Fig. 10, a fragmentary sectional elevation at the inner side of the left hand side of the case that comprises part of the cabinet; Fig. 11, a side elevation of the bill-holding leaves arranged in a pack for storage when not in use; Fig. 12, a fragmentary section approximately on the plane of the line C C in Fig. 1; Fig. 13, a sectional elevation on the line D D in Fig. 12; Fig. 14, a fragmentary section showing the upper portion of a leaf approximately on the plane of the line E E in Fig. 4; Fig. 15, a fragmentary perspective view of one part of the hinge-bar of a leaf; Fig. 16, a fragmentary perspective view of a companion part of the hinge-bar; Fig. 17, a fragmentary sectional elevation showing a modification in the construction of the leaf connections; Fig. 18, a perspective view of one of the leaf connections shown in the preceding figure; Fig. 19, a fragmentary perspective view on an enlarged scale showing details of the leaves illustrated in Fig. 17; Fig. 20, a fragmentary perspective view of one of the leaves; Fig. 21, a fragmentary sectional elevation showing another modification in the construction of the hinging connections of the leaves; Fig. 22, a perspective view of the modified form of connecting link illustrated in the preceding figure; Fig. 23, a fragmentary sectional elevation showing still another modification in the construction of the hinging connections of the leaves; and Fig. 24, a perspective view of the link illustrated in the preceding figure.

Similar reference characters in the different figures of the drawings indicate corresponding elements or features of construction herein referred to.

The bill-filing cabinet comprises a case or upright frame for conveniently supporting the bill-holding leaves for use, and may be variously constructed in detail, a plain case serving to illustrate the invention. The case preferably comprises a desk-like part 1 having a top 1', a back or frame member 2, and sides 3 and 3'. A pair of hook-like leaf supports 4 and 4' are mounted on the inner side of the back 2 at a suitable distance above the top 1', and a button or fastener 5 is mounted on the upper portion of the inner side of the back 2, being preferably supported directly on a base 6.

A suitable number of filing leaves are provided, as may be desired, there being illustrated a rear-leaf 7, a front leaf 7', and a number of intermediate leaves 7''. Each leaf includes a hinge-bar at the normally lower end thereof preferably composed of two parts 8 and 9, the forward part 8 having a horizontal groove 10 in its rearward or inner side, and the part 9 having a bottom plate 11 that has its forward edge seated in the groove; the bottom plate preferably extending at an oblique angle to the plane of the leaf. The two parts of the hinge-bar are provided respectively with abutting filling blocks 12 and 13 which space the parts apart a required distance, and the parts are secured together and to the leaf by means of rivets 14. The rearmost leaf 7 preferably has projections 15 and 15' on the under side of the bottom plate 11 in each of which is a socket 16 to receive a leaf support 4 or 4', it being understood, however, that the lower end of the rearmost leaf may be variously supported in the case, as may be desired. The normally lower forward side of each leaf is provided with two or more pivots or hinge-pins 17, 17', and the leaves preferably have frame-bars 18, 18', thereon which serve as rubbing strips and determine the thickness of the complete leaf. The leaves, as is understood, are provided with suitable devices for holding papers or bill slips thereon, preferably spring clamps 19, 19'. Links 20, 20', are connected at one end thereof to the pivots 17, 17' of each one of the leaves excepting the front leaf, there being two or more links for each leaf, and the opposite ends of the links are connected to the pivots of the adjacent ones of the leaves excepting the rear leaf, so that each link is pivotally connected to the lower forward portion or corresponding side of two adjacent upright leaves, the links preferably being pivoted or hinged together by means of the pivots. The links preferably are composed of plates and each one is provided at one end thereof with two hinging ears 21, 21', and at the opposite end with a single ear 22, so as to form a hinge connection with an adjacent link. The pivots of each leaf preferably are connected to the leaf by means of ears 23 and 23' between which the links are placed. The hinge-bar of each leaf excepting the front leaf is provided with rigid fingers 24, 24', that extend forwardly under the links to which the adjacent forward leaf is pivoted and limit the downward pivotal movement of the links, in order to normally support the intermediate and front leaves in upright position, preferably in echelon or stepped arrangement with the forward leaves slightly lower than those in the rear, the upper end of the rear leaf being fixedly secured by the fastening devices 5, so that each leaf supports the leaf next forward of it, and all the leaves excepting the rear leaf are prevented from falling forward, since they are pivotally supported at the forward sides and the force of gravity impels them rearward when placed in nearly upright position. In some cases, however, the combined weight of all the leaves forward of the rear leaf may cause the leaves to collectively fall forward, to prevent which suitable latches preferably are provided for connecting the upper or free ends of the leaves together when in normal position. Preferably the upper portion of each leaf excepting the front leaf has an aperture 25 therein. The rear side of the leaf is provided with a hinge-pin 26 opposite the aperture and to which a latch-bar 27 is connected and extends through the aperture in which its pivotal movements are limited, the end of the latch-bar having a hook 28 thereon adapted to engage the top of the next forward leaf, and provided also with a thumb-piece 29 for withdrawing the hook. Similar latch-bars 27' are mounted on the intermediate leaves for engaging the adjacent forward leaves. The upper forward portions of the leaves, as will be understood, are provided with indexing characters 30, all of which are in view when the leaves are in normal position in echelon. The upper forward portion of the front leaf 7' is preferably provided with rollers 31, 31', adapted to roll upon the top 1' or to rest thereon when the leaf is in prone position.

In some cases the hinge-bar of each leaf may be slightly modified, a front part 8' with a squared bottom 8'' and a rear part 9' with a squared bottom 11' being employed, and the links are slightly modified to conform to the squared bottom, each link comprising a main portion 32 pivoted to the forward portion of the leaf, and a right angled portion 32' extending behind the leaf and pivoted to the forward portion of the next adjacent leaf. The hinge-bar is provided with a projection 33 extending downward against the rear of the portion 32' of the link to limit the downward pivotal movement of the link, thus holding the link in forwardly extended position when the leaves are upright, the modifications being shown in Figs. 17 to 20 inclusive.

As shown in Figs. 21 and 22, the hinge-bars preferably have squared bottoms, and each link comprises a main portion 34 and a right angled portion 34' from which extends a finger 35 under the bottom of the leaf to which the portion 34' is pivotally connected, the portion 34 being connected to the adjacent forward leaf, so that the pivotal movement of the link is limited by means of the finger 35.

In the modification shown in Figs. 23 and 24 the leaves have oblique angled bottoms, and each hinge-bar comprises a forward part 8″ and a rear part 9″, the bottom 11' being at an oblique angle to the plane of the leaf, the links 36, as in the preferred form being straight and having two hinging ears 37, 37', on one end, and ears 38, 38', on the opposite end, from which extends a finger 39 under the bottom of the leaf to which the ears last mentioned are connected, the ears on the opposite end of the links being connected to the next adjacent forward leaf.

It will be seen that, as a result of the construction described, each leaf excepting the front one supports two links in extended position, the end of each link supporting a pivot or hinge-pin to which the normally lower forward portion of the adjacent forward leaf is connected, so that each leaf stands by force of gravity upon the link.

In practical use, the series of leaves are mounted in the case so that the rear leaf is fixedly supported and supports the remaining leaves normally in upright position. When it is desired to move one or more of the leaves to prone position, the proper latch-bar 27 or 27' is slightly lifted and the leaves or leaf forward of it thus released are drawn or permitted to move forward pivotally until the rollers on the front leaf come in contact with the top of the desk-like part of the case, the connected ends of the leaves being suspended in prone position by the links. When it is desired to return the leaves to normal position their free ends are lifted and pushed rearward until stopped by the remaining or foremost upright leaf and engaged automatically by the latch-bar thereof. When it is desired to remove the leaves from the case in order to place them in a fire proof safe or elsewhere, the fastener 5 is moved to release the top of the rear leaf and then the series of leaves with their tops latched together are lifted from the supports 4, 4', and placed uprightly upon any flat surface, when the leaves will shift position relatively and assume the form of a substantially rectangular pack, as in Fig. 11, so as to occupy the minimum space.

Having thus described the invention, what is claimed as new, is—

1. A filing appliance including a plurality of normally upright filing leaves provided with downwardly inflexible supporting means extending beyond one face thereof, the adjacent leaves being pivotally connected to the supporting means respectively to be bodily supported thereby.

2. A filing appliance including a plurality of filing leaves provided with connecting links, each link being inflexible and pivotally connected to two adjacent ones of the leaves, and means on one of each two adjacent leaves in normal upright position acting to hold the link in forward extended position for bodily supporting the other of the two leaves in upright position.

3. A filing appliance including a plurality of filing leaves normally arranged uprightly face to face, the lower portion of one face of each leaf having a pivot thereon, and a plurality of inflexible links for connecting the leaves together, each link being connected at one end to the pivot of one leaf and extending under, and to the farther face of, the next adjacent leaf and connected to the pivot thereof.

4. A filing appliance including a plurality of filing leaves normally arranged uprightly face to face, a plurality of connecting links pivoted to the lower ends of adjacent leaves, supporting means for the rearmost leaf of the series, and an abutment between each leaf and the link which connects said leaf with the next forward leaf, said abutment limiting the downward rotation of the link on the rearward leaf so that the link will normally support said forward leaf.

5. A filing appliance including a plurality of filing leaves normally arranged uprightly face to face, a plurality of connecting links pivoted to the lower ends of adjacent leaves, supporting means for the rearmost leaf of the series, and a finger on one of the parts forming an abutment between each leaf and the link which connects said leaf with the next forward leaf, said abutment limiting the downward rotation of the link on the rearward leaf so that the link will normally support said forward leaf.

6. A filing appliance including a plurality of bill-holding leaves arranged in upright position, links pivotally connected to the lower forward portions of two adjacent leaves and extending forwardly under adjacent leaves, and means for normally supporting the links against downward pivotal movement when in forwardly extended position.

7. A filing appliance including a plurality of bill-holding leaves normally arranged in upright position, each leaf excepting the foremost one having a rigid forwardly-extending finger on the lower portion thereof, and links pivotally connecting the leaves together and normally supported on the fingers.

8. A filing appliance including a filing leaf uprightly supported and provided on the bottom thereof with a rigid finger, a hinging link pivotally connected to the leaf and limited by the finger in downward pivotal movement, and a second leaf pivotally supported solely by the link.

9. A filing appliance including a plurality of filing leaves adapted to be normally arranged in upright position face to face, links pivotally connected to the normal lower portions of adjacent leaves, each link being inflexible and adapted to extend under and bodily support one of the two adjacent leaves uprightly, stop devices in coöperation with the leaves and the links for normally holding the links in forwardly extended position to support the adjacent leaf thereon, and auxiliary means coöperating with other portions of the leaves for assisting the links to maintain the leaves in upright position thereon.

10. A filing appliance including a plurality of bill-holding leaves normally arranged in upright position, links pivotally connected to the lower forward portions only of adjacent leaves and extending forwardly under and to the plane of the farther forward sides of adjacent leaves, and stop-devices in coöperation with the leaves and the links and preventing downward pivotal movement of the links.

11. A filing appliance including a plurality of leaves arranged in upright position, one leaf being fixedly supported and having fingers on the lower end thereof extending forwardly, links pivoted to said leaf and normally resting upon the fingers, and a leaf pivoted at its lower forward edge to the links and normally held by force of gravity upon the links.

12. A filing appliance including a plurality of leaves, bill-holding devices mounted on the leaves, a case, means for fixedly supporting one of the leaves in the case in upright position, links pivotally connected together and to ends of the leaves and supported solely by the fixedly-supported leaf, the remaining leaves being normally in upright position and movable to prone position, the leaves when in prone position being supported at their connected ends by the links, and fingers on the leaves extending under the links and enabling them to support the leaves when in upright position.

13. A filing appliance including a plurality of normally upright leaves, bill-holding devices on the leaves, inflexible links pivoted at two ends thereof to the corresponding forward sides of adjacent leaves, and means applied directly to the links for enabling the links to support the forwardly adjacent leaves upon the links in upright position.

14. A filing appliance including a case, a plurality of leaves normally in upright position in the case, means for supporting the lower end of the rearward leaf, latching means for connecting the upper end of the rearward leaf to the case, linking devices connecting the lower ends of the leaves together to permit relative vertical movement of the leaves and enabling the rearward leaf to sustain the remaining leaves, and dual means coöperating respectively with the linking devices at the lower ends of the leaves and with the upper ends of adjacent leaves respectively for maintaining the leaves in normal position.

15. A filing appliance including a plurality of leaves, supporting connections for the leaves permitting them to swing relatively to each other, the said connections comprising a plurality of inflexible links, one for each leaf, pivots respectively connecting each two adjacent links together, devices pivotally connecting each leaf with one of said links respectively and permitting the leaf to swing relatively to the link, and link-controlling means on the leaves coöperating with the links and actuated by the operation of the leaves for controlling the swinging movements of said leaves.

16. A filing appliance including a plurality of filing leaves normally arranged face to face in upright position and provided on upper and lower ends thereof with connecting links, each link connecting two adjacent leaves together, the upper and lower ends of each leaf having pivotal connection with the adjacent link to permit longitudinal movement of each leaf relatively to the adjacent leaf, the links on the upper end of the leaves being detachable from one of the two adjacent leaves to permit pivotal movement of the leaves on the lower links.

17. In a filing appliance, the combination of a plurality of filing leaves normally arranged face to face, one end portion of one of the leaves having a pivot thereon and also two stops on planes on opposite sides of the axis of the pivot, and a latch-bar connected to the pivot and extending between the two stops to be limited in pivotal movement thereby, the latch-bar being detachably connected pivotally to the adjacent one of the leaves, with means for connecting the opposite end portions of the plurality of leaves together for pivotal and longitudinal movement, each leaf relatively to the adjacent leaf.

18. In a filing appliance, the combination of a plurality of bill-holding leaves arranged face to face, one end portion of one of the leaves having an aperture therein and being provided with a hinge-pin opposite the aperture, and a latch-bar connected to the hinge-pin and extending through the aperture to and in connection with the corresponding end portion of the adjacent one of the leaves, the movement of the latch-bar on the hinge-pin being limited by the wall of the aperture, with means for connecting the opposite end portions of the plurality of leaves together for relative pivotal movement.

19. In a filing appliance, the combination with a plurality of normally upright filing leaves, of a hinge-plate hingedly connected to the forward side of the lower end of one of the leaves and normally extending downwardly and also forwardly under and to the farther side of the adjacent one of the leaves and hingedly connected thereto, said adjacent leaf being bodily supported in position upon and solely by said hinge-plate, and means for normally preventing downward pivotal movement and maintaining the hinge-plate in normal extended position.

20. A credit register having a set of leaves in stepped relation and hinged to each other, and means for supporting a rear leaf, and thereby the entire set, substantially as described.

21. In a credit register, a set of leaves in stepped relation and hinged to each other, means for supporting the rearmost leaf on a stationary pivot, the hinged connections constituting the sole hinged support for the other leaves, substantially as described.

22. In a credit register, a series of leaves in stepped relation hinged to each other normally in vertical position, and a fixed support for the rearmost leaf, the other leaves being supported through their hinge connections to each other and the rear leaf; substantially as described.

23. In a credit register, a case having a fixed support, and a set of leaves in stepped relation hinged to each other, the rearmost leaf being adapted to removably engage the fixed support and support the other leaves through the hinge connections, substantially as described.

24. A credit register having a set of leaves in stepped relation and hinged to each other, and means for supporting a rear leaf and thereby the entire set, said hinges being arranged for permitting said leaves to be bunched to place the tops of all of said leaves in a common plane, approximately at right angles to the planes of the leaves, substantially as described.

In testimony whereof, I affix my signature in presence of two witnesses.

ELLIS T. SILVIUS.

Witnesses:
P. A. HAVELICK,
J. H. GARDNER.

Copies of this patent may be obtained for five cents each, by addressing the "Commissioner of Patents, Washington, D. C."